United States Patent Office 2,856,576
Patented Oct. 14, 1958

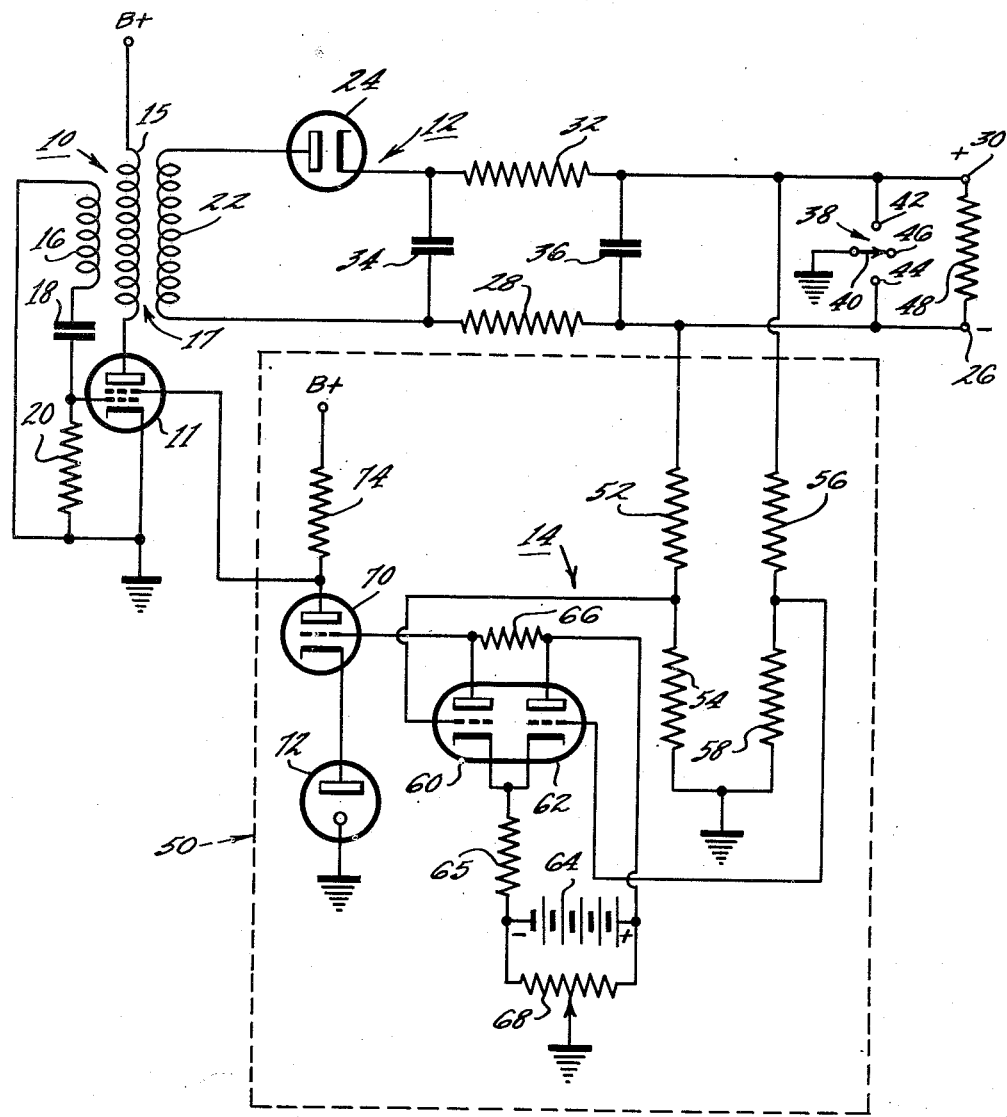

2,856,576

REGULATED POWER SUPPLY

Harvey O. Hook, Princeton, N. J., assignor to Radio Corporation of America, a corporation of Delaware Application June 1, 1954, Serial No. 433,616

8 Claims. (Cl. 321—18)

This invention relates to regulated power supplies generally, and more particularly to a regulated, radio-frequency, high voltage, power supply having output terminals either of which may be grounded selectively.

The terms positive voltage output and negative voltage output as applied to the power supply in this specification, and in the appended claims, are used to describe the output of a unidirectional power supply having either the negative output terminal or the positive output terminal grounded, respectively.

In the electronics laboratory, radio-frequency power supplies are used when unidirectional, high voltages of the order of many thousands of volts at moderate current requirements are desired. Regulated, radio-frequency power supplies are usually designed to deliver either a unidirectional, positive voltage output or a unidirectional, negative voltage output. The reason for this is that the regulating circuit of the power supply is usually designed to operate at a relatively low voltage say 300 volts, and is not insulated to withstand the relatively high voltages across the output terminals. If a negative voltage output is desired from the usual radio-frequency power supply designed to deliver a positive output voltage, the positive terminal of the power supply may not be grounded to obtain this because the regulating circuit will be placed at the relatively high voltage output of the power supply, with respect to ground, and the regulating circuit is usually not insulated to withstand this relatively high voltage output. Consequently, it is the usual practice to use separate, regulated, high voltage power supplies for positive voltage outputs and negative voltage outputs, respectively.

Where it is necessary to operate and/or test many different types of experimental electronic equipment, requiring the temporary use of a regulated, high voltage, radio-frequency power supply, it is very desirable to use a power supply capable of having either its positive or negative output terminal grounded without affecting its regulation. If the same regulated, radio-frequency, power supply could be used in different circuits, because either of its output terminals may be grounded, its use as a piece of laboratory equipment would be doubly extended and the additional expense resulting from the need for separate regulated power supplies would be obviated.

It is, accordingly, a principal object of the present invention to provide an improved, regulated, high voltage power supply of the type described in which the regulating circuit need be insulated for relatively low voltages only.

It is the further object of the present invention to provide an improved, regulated, high voltage power supply adapted to provide a regulated, unidirectional voltage across a pair of output terminals, neither of which is directly grounded.

Another object of the present invention is to provide an improved, regulated, radio-frequency, high voltage power supply capable of having either one of its output terminals grounded without affecting the operation or the range of regulation of the power supply.

Still another object of the present invention is to provide an improved power supply adapted to provide a regulated, unidirectional, voltage output when neither one of the output terminals is at ground potential, and when both output terminals have a relatively low capacitance and/or high impedance to ground.

Still a further object of the present invention is to provide an improved, regulated power supply of the type described that is simple in construction and operation, economical to manufacture, and yet highly efficient in use.

According to the invention, these and other objects and advantages are obtained in a regulated radio-frequency, high voltage power supply comprising an oscillator circuit, a rectifying circuit and a regulating circuit. High frequency voltage oscillations produced by the oscillator circuit are stepped up and rectified by the rectifying circuit to provide a relatively high unidirectional voltage between the positive and negative output terminals of the power supply. Each of the output terminals is connected to a point of reference potential, such as ground, through a separate voltage divider, respectively. The regulating circuit comprises a cathode coupled amplifier comprising two electron tubes each having at least an anode, a grid and a cathode. A sample voltage derived from each voltage divider, at a point dividing each voltage divider in a similar proportion, is fed back degeneratively to the oscillator circuit through the regulating circuit. Each of the sample voltages from the two voltage dividers is applied to separate grids, respectively, of the cathode coupled amplifier. The output voltage of the cathode coupled amplifier is then amplified and applied to one of the electrodes of an oscillator tube in the oscillator circuit in a polarity to control the amplitude of the voltage oscillations inversely with any variations in the magnitude of the output voltage of the power supply. With the arrangement of the present invention, it is possible to provide a relatively high, unidirectional, output voltage in the order of kilovolts, with respect to ground, and yet maintain the regulating circuit of the power supply at a relatively low voltage. The regulated power supply of the present invention may be used to provide a "floating" unidirectional voltage output as when neither one of the output terminals is connected directly to the point of reference potential.

The novel features of the invention, as well as the invention itself, both as to its organization and method of operation, will be understood in detail from the following description when considered in connection with the accompanying drawing which is a schematic diagram of a regulated power supply, in accordance with the present invention.

Referring now to the drawing, there is shown a regulated, radio-frequency, high voltage power supply, comprising an oscillator circuit 10, a rectifying circuit 12 and a regulating circuit 14. While the oscillator circuit 10 may comprise any suitable source of alternating voltage, the regulated power supply of the present invention will be explained in connection with a radio-frequency power supply, as a preferred embodiment, because the advantages of the present invention are more dramatically exhibited thereby. The oscillator circuit 10, as shown in the drawing, is of the Armstrong regenerative type wherein a voltage from the plate of an oscillator tube 11 is fed back to the control grid thereof. The anode of the oscillator tube 11 which may be a tetrode, is connected to a source of B+ operating potential through a primary inductance 15 of a transformer 17. A feedback coil, or inductance 16, inductively coupled to the inductance 15 has one end connected to the cathode of the tube 11 and the other end connected to the control grid of the tube 11, through the capacitor 18. The control grid of the tube 11 is connected to the cathode thereof through a resistor 20; and the cathode is connected to a source of reference potential, such as ground. It will now be understood that the oscillator circuit 10 is a source of radio-frequency voltage oscillations.

An inductance 22, the secondary of transformer 17 inductively coupled to the inductance 15 and wound in a voltage step-up relationship thereto, has one end connected to the anode of a rectifier 24, and the other end connected to a negative output terminal 26 of the power supply, through a smoothing resistor 28. The cathode of the rectifier 24 is connected to a positive output terminal 30 of the power supply, through a smoothing resistor 32. A filter capacitor 34 is connected between one end of each of the resistors 28 and 32; and a filter capacitor 36 is connected between the other ends of the resistors 28 and 32.

Means are provided to selectively ground either of the output terminals 30 and 26, or to leave them in a "floating" condition, whereby neither output terminal is grounded. To this end, a three position switch 38 has an armature 40, one end of which is grounded and the other end of which is adapted to connect with one of three contacts selectively. A contact 42 of the switch 38 is connected to the positive output terminal 30 for the purpose of grounding the positive output terminal 30, as when a negative voltage output of the power supply is desired. A contact 44 of the switch 38 is connected to the negative output terminal 26 for the purpose of grounding the output terminal 26, as when a positive voltage output of the power supply is desired. A contact 46 of the switch 38 is provided for the purpose of maintaining the armature 40 of the switch 38 out of contact with either the positive output terminal 30 or the negative output terminal 26, as when it is desired to have the output voltage of the power supply "floating." Thus, it will be understood, that by means of the switch 38 the output voltage of the power supply across the output terminals 26 and 30 may be either a positive voltage output, a negative voltage output or a floating voltage output. A resistor 48 connected between the output terminals 26 and 30 may be considered representative of a utilization load on the power supply.

The regulating circuit 14, enclosed within the dashed rectangle 50 in the drawing, is operated at a relatively low voltage, say a few hundred volts with respect to ground, as compared with the output voltage of the power supply across the load 48, which may be in the order of many kilovolts. The negative output terminal 26 is connected to the point of reference potential, ground, through a voltage divider comprising a resistor 52 connected in series with a resistor 54. The positive output terminal 30 is connected to ground through a voltage divider comprising a resistor 56 connected in series with a resistor 58. The numerical ratio of the resistance of the resistor 52 to the resistance of the resistor 54 is equal to the numerical ratio of the resistance of the resistor 56 to the resistance of the resistor 58. Thus, it will be understood, that the junction between the resistors 52 and 54 divides the voltage divider of which it is a part into the same ratio as the junction between the resistors 56 and 58 divides the voltage divider of which the latter junction is a part.

The regulating circuit 14 comprises a cathode coupled amplifier comprising two electron tubes 60 and 62. The tubes 60 and 62 may be separate triodes or they may be incorporated into a single envelope as a duo-triode, as illustrated in the diagram. The cathodes of the triode tubes 60 and 62 are connected to each other and to the negative terminal of a source 64 of unidirectional voltage, through a common resistor 65. The voltage source 64 is represented in the drawing as a battery but it is understood that it may be any other suitable source of unidirectional voltage. The positive terminal of the unidirectional voltage source 64 is connected directly to the anode of the tube 62, and indirectly to the anode of the tube 60 through a load resistor 66. A potentiometer 68 is connected across the unidirectional voltage source 64 and the movable tap of the potentiometer 68 connects substantially the mid-point of the potentiometer 68 to ground. The control grid of the tube 60 is connected to the junction of the resistors 52 and 54; and the control grid of the tube 62 is connected to the junction of the resistors 56 and 58.

The output of the cathode coupled amplifier, comprising the tubes 60 and 62, is taken from the anode of the tube 60 and eventually applied to one of the electrodes, such as the screen grid, of the oscillator tube 11 of the oscillator circuit 10. In the preferred embodiment illustrated, the output of the cathode coupled amplifier is derived from the anode of the tube 60 and fed to the grid of an amplifier tube 70. The cathode of the tube 70 is connected to ground through a voltage regulator tube 72, of the gaseous type, for the purpose of maintaining the cathode of the tube 70 at a fixed potential with respect to ground. The anode of the tube 70 is connected to a source of B+ operating potential through a load resistor 74. The output of the amplifier 70 is derived from the anode thereof and applied to the screen grid of the oscillator tube 11 of the oscillator circuit 10. It will be understood that the regulating circuit 14 provides a means for feeding back samples of the voltages between each of the output terminals and ground to one of the electrodes of the oscillator tube in a manner to control the amplitude of the voltage oscillations in an inverse proportion to any variations in the magnitude of the output voltage between the output terminals 26 and 30.

The operation of the regulated, radio-frequency, high voltage power supply, in accordance with the principles of the present invention, will now be described. Let it be assumed that a positive voltage output is desired. The armature 40 of the switch 38 is moved to connect with the contact 44 thereby grounding the negative output terminal 26. The voltage oscillations of the oscillator circuit 10 are stepped-up by the transformer 17 rectified by the rectifier 24 and applied across the load 48, in the usual manner well known in the art of radio-frequency power supplies. Let it now be assumed that there is a tendency of the voltage across the load 48 to increase; that is, the voltage at the output terminal 30 tends to increase with respect to the grounded output terminal 26. Any increase in volage at the output terminal 30 is immediately sensed by the grid of the tube 62 of the cathode coupled amplifier. Since the negative output terminal 26 is grounded the potential at the grid of the tube 60 will remain substantially constant. The positive-going signal on the grid of the tube 62 will cause conduction through the tube 62 to increase, thereby raising the voltage at the cathode of the tube 60. An increase in the voltage of the cathode of the tube 60 has the same effect as the decrease in the voltage on its grid, thereby causing conduction to decrease through the tube 60. As a result of the decreased conduction in the tube 60, a positive-going signal is derived at the anode thereof, which is, in fact, the output of the cathode coupled amplifier, and applied to the grid of the amplifier 70. The positive-going signal applied to the grid of the amplifier 70 will produce a negative-going signal at the anode thereof. This latter negative-going signal is applied to the screen grid of the oscillator tube 11, in the oscillator circuit 10, whereby the voltage oscillations produced by the oscillator circuit 10 will be reduced in amplitude. This latter decrease in the amplitude of the voltage oscillations of the oscillator 10 will result in a decrease in the voltage rectified. Consequently, the voltage output between the output terminals 26 and 30 will tend to decrease, and thereby offset the original tendency of the voltage thereacross to increase. It will be understood, that a tendency for the voltage at the output terminal 30 to decrease will result in a reverse set of conditions whereby the amplitude of the oscillations of the oscillator circuit 10 will increase and produce a higher output voltage that will overcome the tendency of the output voltage to drop.

Let it now be assumed that a relatively high, unidirectional, negative, output voltage is desired from the power supplied. The armature 40 of the switch 38 will now be moved to connect with the contact 42, and thereby ground the positive output terminal 30. A negative voltage output is now provided across the load 48. Let it also be assumed that, for one reason or another, the negative output voltage across the load 48 tends to increase. This will result in a negative-going voltage at the negative terminal 26, since the terminal 30 is grounded. This negative-going voltage is sensed by the control grid of the tube 60. Since the positive output terminal is grounded, the voltage at the control grid 62 will remain substantially constant. The negative-going voltage on the control grid 60 causes the current therethrough to decrease, thereby providing a positive-going voltage at the anode thereof. This positive-going voltage is applied to the grid of the amplifier 70 which, in turn, will provide a negative-going signal at the anode thereof. This latter negative-going signal is applied to the screen grid of the oscillator tube 11 and consequently the amplitude of the voltage oscillations of the oscillator circuit 10 will decrease. This latter chain of events will result in a decreased voltage output across the load 48, thereby tending to offset the tendency of the output voltage to increase. Again, it will be noted, that a tendency for the voltage between the output terminals 26 and 30 to decrease will be offset by a reverse set of conditions, to that just described, whereby the output voltage across the load 48 will tend to increase.

In accordance with the present invention, the regulated power supply may be used as a "floating" power supply, wherein neither the positive output terminal 30 nor the negative output terminal 26 is connected directly to ground. Under these conditions a tendency for the output voltage between the output terminals 26 and 30 to increase will be offset by a set of conditions tending to decrease the output voltage, and vice versa. For example, let it be assumed that the unidirectional voltage across the load 48 is floating, as when the armature 40 of the switch 38 is connected to the isolated contact 46. Let it also be assumed, for example, that the voltage across the load 48 tends to decrease. If it is assumed that the voltage at the positive output terminal 30 decreases with respect to the negative output terminal 26, and it is also assumed that the voltage at the negative output terminal 26 remains substantially constant, it will be seen that the grid of the tube 62 will receive a negative-going voltage, resulting in decreased conduction through the tube 62. This latter decreased conduction will cause the voltage at the cathode of the tube 60 to decrease, since the cathode of the tube 60 is tied to the cathode of the tube 62, and since they both share the common cathode resistor 65. By decreasing the voltage at the cathode of the tube 60 and maintaining the control grid thereof substantially constant, a negative-going voltage will be derived at the anode of the tube 60. This negative-going voltage is amplified and inverted by the amplifier tube 70 and its associated circuit and applied to the screen grid of the oscillator tube 11, in the oscillator circuit 10, as a positive-going voltage. As a consequence of this latter positive-going voltage applied to the screen grid of the oscillator 11, the amplitude of the voltage oscillations of the oscillator circuit 10 will increase, thereby providing an increased unidirectional voltage between the output terminals 26 and 30. Thus, the tendency of the output voltage across the load 48 to decrease is offset by a series of conditions which tends to increase the output voltage across the load 48. It will also be understood that a tendency for the voltage to increase, when the output voltage is floating, will be offset by a set of conditions tending to produce a decreased output voltage.

Any tendency for the voltages at both the positive output terminal 30 and the negative output terminal 26 to increase or decrease simultaneously will be compensated for by the regulating circuit 14. For example, let it be assumed the voltage between the output terminals 26 and 30 is floating and that there is a tendency for the voltage at both the terminals 26 and 30 to increase simultaneously. Under these conditions the control grids of the tubes 60 and 62 will cause the cathode of the tube 60 to increase. The grid of the tube 60, however, has also increased in voltage and will tend to maintain the same grid-cathode voltage relationship within the tube so that the voltage at the anode thereof will remain substantially constant. Consequently, no signal will be fed back to the screen grid of the oscillator tube 11, and the unidirectional output voltage across the load 48 will remain substantially the same. It is noted that a tendency for both of the output terminals 30 and 26 to decrease in voltage simultaneously will give set rise to a reverse set of conditions whereby the unidirectional voltage across the load 48 will also remain substantially constant.

Thus, there has been shown and described herein, in accordance with the objects of the present invention, an improved, regulated, radio-frequency, high voltage power supply capable of producing either a positive or negative voltage output, or a floating unidirectional output wherein the voltage output of the power supply may be in the order of many kilovolts and its regulating circuit need be insulated for voltages in the neighborhood of several hundred volts only. The reversibility of the voltage output is accomplished by feeding back degeneratively sample voltages, to the oscillator circuit, obtained from separate voltage dividers each connected between a point of reference potential and a separate one of the output terminals. While the regulating circuit of the present invention is neither exclusively nor specifically limited to radio-frequency power supplies, it is particularly, advantageously applicable to power supplies whose output has a high impedance and low capacitance to ground. Also, with the regulating circuit of the present invention, it is possible to obtain either a positive, negative or floating unidirectional voltage output by either grounding one of the output terminals or by ungrounding both, respectively, without the necessity of any internal switching in the regulating circuit, or elsewhere in the power supply.

What is claimed is:

1. A regulated power supply comprising an oscillator circuit to produce voltage oscillations, positive and negative voltage output terminals, a rectifier circuit connected to said output terminals and including means coupling said rectifier circuit to said oscillator circuit to rectify said voltage oscillations therefrom and to provide a unidirectional output voltage between said terminals, a point of reference potential, an amplifier circuit comprising two current controlled devices connected to form two parallel current paths, a separate input means in each of said devices for controlling the respective current path thereof, a separate voltage divider connected between each output terminal and said point of reference potential, means to connect a selected point on each of said voltage dividers to a separate one of said input means, and means to connect the output of said amplifier circuit to said oscillator circuit.

2. A regulated power supply comprising an oscillator circuit to produce voltage oscillations, positive and negative voltage output terminals, a rectifier circuit connected to said output terminals and including means coupling said rectifier circuit to said oscillator circuit to rectify said voltage oscillations therefrom and to provide a unidirectional output voltage between said terminals, a point of reference potential, an amplifier circuit comprising two current controlled devices connected to form two parallel current paths, a separate input means in each of said devices for controlling the respective current path thereof, a separate voltage divider connected between each output terminal and said point of reference potential, means to connect a selected point on each of said voltage dividers to a separate one of said input means, and means to connect the output of said amplifier circuit to said oscillator circuit, each of said selected points on each of said voltage dividers dividing each of said voltage dividers in a similar voltage ratio.

3. In a power supply of the type having positive and negative voltage output terminals and wherein a positive voltage output polarity is selected when said negative voltage output terminal is connected to a point of reference voltage, and a negative voltage output polarity is selected when said positive voltage output terminal is connected to said point of reference voltage, in combination, means to connect and to disconnect each of said terminals to said point of reference voltage selectively, means for producing a unidirectional voltage between said terminals, a separate voltage divider between each of said terminals and said point of reference voltage, a regulator circuit having two current controlled devices connected to form two parallel current paths, a separate input means in each of said devices for controlling the respective current path thereof, means to apply a separate feedback signal from each of said voltage dividers to a separate one of said two input means, respectively, and means to apply the output of said regulator circuit to said unidirectional voltage producing means to control the amplitude of said unidirectional voltage.

4. In a power supply of the type having positive and negative output terminals and wherein a positive voltage output polarity is selected when said negative voltage output terminal is connected to a point of reference voltage, and a negative voltage output polarity is selected when said positive voltage output terminal is connected to said point of reference voltage, in combination, means to connect and to disconnect each of said terminals to said point of reference voltage selectively, means for producing a unidirectional voltage between said terminals, a separate voltage divider between each of said terminals and said point of reference voltage, a regulator circuit having two current controlled devices connected to form two parallel current paths, a separate input means in each of said devices for controlling the respective current path thereof, means to apply a separate feedback signal from each of said voltage dividers to a separate one of said two input means, respectively, means to apply the output of said regulator circuit to said unidirectional voltage producing means to control the amplitude of said unidirectional voltage, said unidirectional voltage producing means comprising an oscillator circuit including an oscillator device having a plurality of electrodes, and said output of said regulating circuit being connected to one of said electrodes of said oscillator device to control the amplitude of its oscillations as a function of said output.

5. A regulated power supply comprising a source of alternating current, positive and negative output voltage terminals, rectifying means coupled to said source and in circuit with said terminals, whereby to rectify said alternating current and to produce a unidirectional voltage between said terminals, a point of reference potential, a separate voltage divider connected between each of said terminals and said point of reference potential, an amplifier circuit comprising two electron tubes each having at least three electrodes, means to apply a source of unidirectional potential between two of said electrodes in each of said tubes respectively, a third electrode in each of said tubes being connected to a point on a separate one of said voltage dividers, each of said last-mentioned points dividing its respective voltage divider in a similar voltage proportion, a resistor connected between one of said two of said electrodes in one of said two tubes and one of said two of said electrodes in the other of said two tubes, each of the other of said two of said electrodes in each of said two tubes being connected to each other, means connected between said one of said two of said electrodes in one of said tubes and said source of alternating current to control the amplitude of said alternating current inversely with any variations in the magnitude of said unidirectional voltage between said terminals.

6. A regulated power supply comprising a source of alternating current, positive and negative output voltage terminals, rectifying means coupled to said source and in circuit with said terminals, whereby to rectify said alternating current and to produce a unidirectional voltage between said terminals, a point of reference potential, a separate voltage divider connected between each of said terminals and said point of reference potential, an amplifier circuit comprising two electron tubes each having at least three electrodes, means to apply a source of unidirectional potential between two of said electrodes in each of said tubes respectively, a third electrode in each of said tubes being connected to a point on a separate one of said voltage dividers, each of said last-mentioned points dividing its respective voltage divider in a similar voltage proportion, a resistor connected between one of said two of said electrodes in one of said two tubes and one of said two of said electrodes in the other of said two tubes, each of the other of said two of said electrodes in each of said two tubes being connected to each other, means connected between said one of said two of said electrodes in one of said tubes and said source of alternating current to control the amplitude of said alternating current inversely with any variations in the magnitude of said unidirectional voltage between said terminals, said source of alternating current comprising an oscillator tube having a plurality of electrodes, and said last-mentioned means comprising amplifying means having an input connected to said one electrode of said two of said electrodes in said one of said tubes and an output connected to one of said plurality of electrodes of said oscillator tube.

7. A regulated power supply comprising an oscillator circuit, positive and negative output voltage terminals, a rectifier circuit coupled to said oscillator circuit and connected to said output terminals to rectify oscillations from said oscillator circuit and to provide a unidirectional output voltage between said terminals, a point of reference potential, a first voltage divider connected between said positive output voltage terminal and said point of reference potential, a second voltage divider connected between said negative output voltage terminal and said point of reference potential, an amplifier circuit comprising two electron tubes each having at least a cathode, a grid and an anode, said cathodes being connected to each other, a resistor connected between said anodes, means including said resistor to apply a source of operating potential between said cathodes and said anodes, means to connect said point of reference potential to an intermediate point on said source of operating potential, one of said grids being connected to a point on said first voltage divider, the other of said grids being connected to a point on said second voltage divider, and means connected between one of said anodes and said oscillator circuit to vary the amplitude of said oscillations inversely with any variations in the magnitude of said unidirectional output voltage.

8. A regulated power supply comprising an oscillator circuit, positive and negative output voltage terminals, a rectifier circuit coupled to said oscillator circuit and connected to said output terminals to rectify oscillations from said oscillator circuit and to provide a unidirectional output voltage between said terminals, a point of reference potential, a first voltage divider connected between said positive output voltage terminal and said point of reference potential, a second voltage divider connected between said negative output voltage terminal and said point of reference potential, an amplifier circuit comprising two electron tubes each having at least a cathode, a grid and an anode, said cathodes being connected to each other, a resistor connected between said anodes, means including said resistor to apply a source of operating potential between said cathodes and said anodes, means to connect said point of reference potential to an intermediate point on said source of operating potential, one of said grids being connected to a point on said first voltage divider, the other of said grids being connected to a point on said second voltage divider, means connected between one of said anodes and said oscillator circuit to vary the amplitude of said oscillations inversely with any variations in the magnitude of said unidirectional output voltage, said oscillator circuit comprising an oscillator device having a plurality of electrodes, and said last-mentioned means comprising an amplifier having an input connected to said one of said anodes, and an output connected to one of said plurality of electrodes.

References Cited in the file of this patent

UNITED STATES PATENTS

| | | |
|---|---|---|
| 2,565,621 | Olson | Aug. 28, 1951 |
| 2,644,917 | Smith | July 27, 1953 |
| 2,690,543 | Kurshan | Sept. 28, 1954 |